United States Patent
Geng et al.

(10) Patent No.: US 11,026,002 B2
(45) Date of Patent: Jun. 1, 2021

(54) METHOD FOR MANAGING ONU IN PASSIVE OPTICAL NETWORK, OLT AND SYSTEM

(71) Applicant: ZTE CORPORATION, Shenzhen (CN)

(72) Inventors: Dan Geng, Shenzhen (CN); Bo Yang, Shenzhen (CN); Xingang Huang, Shenzhen (CN); Zhuang Ma, Shenzhen (CN); Liquan Yuan, Shenzhen (CN); Weiliang Zhang, Shenzhen (CN)

(73) Assignee: ZTE CORPORATION

( * ) Notice: Subject to any disclaimer, the term of this patent is extended or adjusted under 35 U.S.C. 154(b) by 0 days.

(21) Appl. No.: 16/647,039

(22) PCT Filed: Sep. 13, 2018

(86) PCT No.: PCT/CN2018/105575
§ 371 (c)(1),
(2) Date: Mar. 13, 2020

(87) PCT Pub. No.: WO2019/052515
PCT Pub. Date: Mar. 21, 2019

(65) Prior Publication Data
US 2020/0260164 A1    Aug. 13, 2020

(30) Foreign Application Priority Data

Sep. 13, 2017   (CN) .......................... 201710824347.1
Jun. 15, 2018   (CN) .......................... 201810618029.4

(51) Int. Cl.
*H04B 10/00* (2013.01)
*H04Q 11/00* (2006.01)
(Continued)

(52) U.S. Cl.
CPC ........ *H04Q 11/0067* (2013.01); *H04J 3/0682* (2013.01); *H04J 3/1605* (2013.01);
(Continued)

(58) Field of Classification Search
CPC .... H04B 10/27; H04B 10/272; H04B 10/278; H04J 14/08; H04J 14/086
See application file for complete search history.

(56) References Cited

U.S. PATENT DOCUMENTS

2009/0310964 A1   12/2009   Sugawara et al.
2018/0309518 A1*  10/2018   Gao ..................... H04B 10/272

FOREIGN PATENT DOCUMENTS

| CN | 102075820 | 5/2011 |
| CN | 102148647 | 8/2011 |
| CN | 102883234 | 1/2013 |

OTHER PUBLICATIONS

Patent Cooperation Treaty (PCT), International Search Report and Written Opinion for Application PCT/CN2018/105575 filed on Sep. 13, 2018, dated Nov. 30, 2018, International Searching Authority, CN.

\* cited by examiner

*Primary Examiner* — Daniel G Dobson
(74) *Attorney, Agent, or Firm* — McDonald Hopkins LLC

(57) ABSTRACT

Provided are a method for managing an ONU in a passive optical network, an OLT and a system. The method includes determining a first quiet window and a second quiet window, and allocating the first quiet window to an ONU within a first preset distance range and allocating the second quiet window to an ONU within a second preset distance range, where the distance between the optical line terminal (OLT) and the ONU within the first preset distance range is less than the distance between the OLT and the ONU within the second preset distance range.

20 Claims, 8 Drawing Sheets

(51) Int. Cl.
*H04J 3/06* (2006.01)
*H04J 3/16* (2006.01)
*H04J 14/02* (2006.01)
*H04J 14/00* (2006.01)

(52) U.S. Cl.
CPC .. *H04J 14/0282* (2013.01); *H04Q 2011/0064* (2013.01); *H04Q 2011/0079* (2013.01); *H04Q 2011/0088* (2013.01)

METHOD FOR MANAGING ONU IN PASSIVE OPTICAL NETWORK, OLT AND SYSTEM

CROSS-REFERENCE TO RELATED APPLICATIONS

This application is a 35 U.S.C. 371 national stage filing of PCT Application No. PCT/CN2018/105575 filed on Sep. 13, 2018 which is based on and claims priority to Chinese patent applications No. 201710824347.1 and No. 201810618029.4, disclosures of which are incorporated herein by reference in their entities.

TECHNICAL FIELD

The present application relates to, but is not limited to, the technical field of mobile communications and, in particular, to a method for managing an optical network unit (ONU) in a passive optical network (PON), an optical line terminal (OLT) and a system.

BACKGROUND

With the development of network technologies, a large amount of traffic such as voice, data and video can be transmitted via a network, and new traffic such as virtual video emerges currently, so that the requirement on bandwidths is continuously increasing, and a PON with a 40 G rate emerges under this requirement.

The topology of a PON system is shown in FIG. 1. A PON system is generally composed of an optical line terminal (OLT) at an office side, an ONU at a user side and an optical distribution network (ODN). The PON system generally adopts a one-to-multiple network structure. The ODN is composed of a single-mode fiber, an optical branching device (also referred to as an optical splitter), an optical connector and other passive optical devices. The ODN provides an optical transmission medium for a physical connection between the OLT and the ONU. When the distance between the OLT and the ONU exceeds 20 kilometers (km), the optical power budget of the PON system cannot satisfy an error rate of signals in normal communications between the OLT and the ONU, it is therefore necessary to add a range extender (RE) to the PON system to amplify signals sent by the OLT and the ONU. The range extender is generally added between the OLT and the ODN. As shown in FIG. 2, the PON system added with the range extender can support the normal communications when the OLT and the ONU are arranged at a large distance. However, although the communications at the large distance can be implemented after the extender is introduced, it is found that an ONU introduced through the extender may have a low registration success rate or easily have an optical signal collision with another ONU closer to the OLT.

SUMMARY

Embodiments of the present disclosure provide a method and system for managing an ONU in a passive optical network, and an OLT.

An embodiment of the present disclosure provides a method for managing an ONU in a passive optical network. The method includes the steps described below.

A first quiet window and a second quiet window are determined.

The first quiet window is allocated to an ONU within a first preset distance range, and the second quiet window is allocated to an ONU within a second preset distance range.

The distance between an optical line terminal (OLT) and the ONU within the first preset distance range is less than the distance between the OLT and the ONU within the second preset distance range.

An embodiment of the present application further provides an optical line terminal (OLT). The OLT includes an apparatus for managing an ONU in a passive optical network, where the apparatus includes a first determination module and an allocation module.

The first determination module is configured to determine a first quiet window and a second quiet window.

The allocation module is configured to allocate the first quiet window to an ONU within a first preset distance range and allocate the second quiet window to an ONU within a second preset distance range.

The distance between an optical line terminal (OLT) and the ONU within the first preset distance range is less than the distance between the OLT and the ONU within the second preset distance range.

An embodiment of the present disclosure further provides an optical line terminal (OLT). The OLT includes a processor, and a memory configured to store a computer program executable by the processor.

The processor performs the steps of the method described above when executing the computer program.

An embodiment of the present application further provides a system for managing an ONU in a passive optical network. The system includes an optical line terminal (OLT), an ONU within a first preset distance range, and an ONU within a second preset distance range, where the OLT is the preceding OLT. The system further includes a range extender (RE).

The RE is disposed between a first optical splitter and a second optical splitter, where the first optical splitter is disposed between the OLT and the ONU within the first preset distance range, and the second optical splitter is disposed between the RE and the ONU within the second preset distance range.

Alternatively, the RE is disposed between the OLT and a third optical splitter, where the third optical splitter is disposed between the RE and the ONU within the second preset distance range.

An embodiment of the present disclosure provides a method for managing an optical network unit (ONU) in a passive optical network. The method includes the steps described below.

A third quiet window is determined and allocated to the ONU.

The start time of the third quiet window is T3+the minimum response time of the ONU+the minimum loop delay between an optical line terminal (OLT) and N range extenders (REs)+an RE response time.

N is an integer greater than or equal to 1, T3 is the start time of sending uplink data by the ONU, the REs are disposed between the OLT and a third optical splitter, and the third optical splitter is disposed between the REs and the ONU.

An embodiment of the present application provides an optical line terminal (OLT). The OLT includes a window determination module and a window allocation module.

The window determination module is configured to determine a third quiet window.

The window allocation module is configured to allocate the third quiet window to an ONU.

The start time of the third quiet window is T3+the minimum response time of the ONU+the minimum loop delay between the optical line terminal (OLT) and N range extenders (REs)+an RE response time.

N is an integer greater than or equal to 1, T3 is the start time of sending uplink data by the ONU, the REs are disposed between the OLT and a third optical splitter, and the third optical splitter is disposed between the REs and the ONU.

An embodiment of the present application provides an optical terminal (OLT). The OLT includes a processor and a computer-readable storage medium, where the computer-readable storage medium stores instructions, and any one of the preceding methods for managing an optical network unit (ONU) in a passive optical network is performed when the processor executes the instructions.

An embodiment of the present disclosure provides a system for managing an optical network unit (ONU) in a passive optical network. The system includes any one of the preceding optical line terminals (OLT), the ONU and a range extender (RE).

The range extender RE is disposed between the OLT and a third optical splitter, where the third optical splitter is disposed between the RE and the ONU.

Embodiments of the present disclosure provide a method and system for managing an ONU in a passive optical network, and an OLT. The method includes determining a first quiet window and a second quiet window, and allocating the first quiet window to an ONU within a first preset distance range and allocating the second quiet window to an ONU within a second preset distance range, where the distance between the optical line terminal (OLT) and the ONU within the first preset distance range is less than the distance between the OLT and the ONU within the second preset distance range. According to the embodiments of the present application, ONUs within different distance ranges are allocated corresponding quiet windows for registration and these quiet windows satisfy both a loop delay of the ONU farthest from the OLT and a loop delay of the ONU closest to the OLT. Such configuration reduces an uplink bandwidth and thereby improves uplink transmission efficiency of the PON compared with the configuration of a uniform quiet window satisfying the need for registration of a farther ONU. Moreover, such configuration reduces the probability of the registration failure of the farther ONU compared with the configuration of a uniform quiet window having a shorter duration.

Furthermore, such configuration reduces an optical signal collision when a closer ONU has begun communication while the farther ONU is being registered. In summary the OLT can manage farther ONUs so that efficiency of the OLT and cost performance of the PON system are improved.

DETAILED DESCRIPTION

The present application is described below in detail in conjunction with embodiments.

Figure 1:
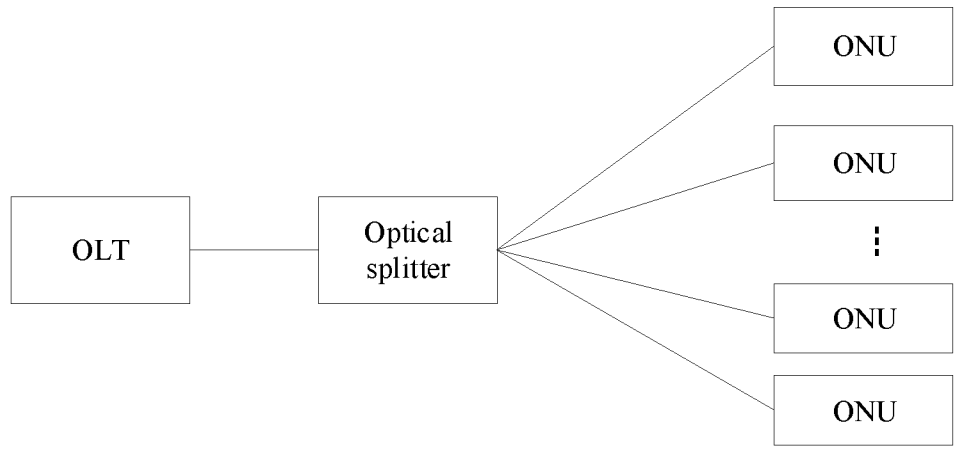
FIG. 1 is a topology diagram of a passive optical network.
Figure 2:
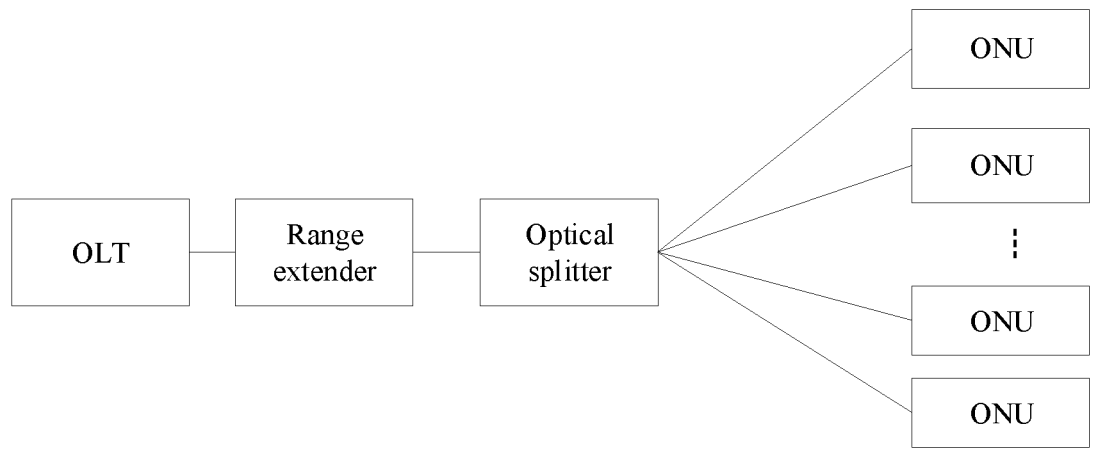
FIG. 2 is a topology diagram of a long-range passive optical network.
Figure 3:
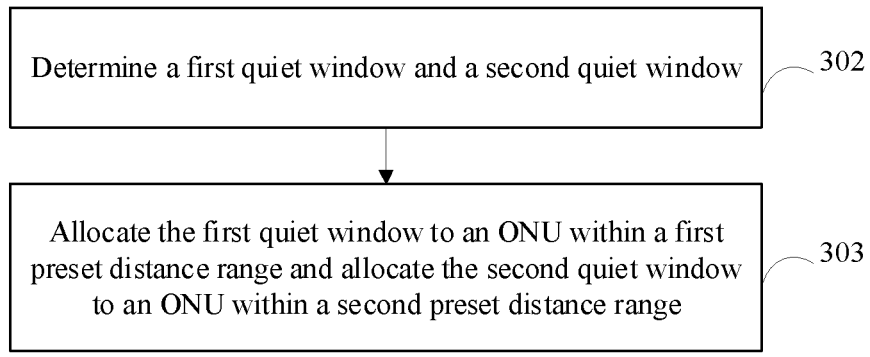
FIG. 3 is flowchart 1 of a method for managing an ONU in a passive optical network according to an embodiment of the present application.

It is found through research that an OLT opens a quiet window for an ONU connected to a PON system and the quiet window may be used for ONU registration, but the size of the quiet window opened by the OLT cannot satisfy both a loop delay of the ONU farthest from the OLT and a loop delay of the ONU closest to the OLT described above. That is, when an uplink optical signal is sent to the OLT by the ONU farthest from the OLT or the ONU closest to the OLT, the arrival time of the uplink optical signal may exceed the range of the quiet window and collide with an uplink optical signal of another ONU that is operating normally. To reduce an optical signal collision, the OLT may open a relatively large (larger than standard) quiet window for the ONU registration, but this wastes an uplink bandwidth and reduces uplink transmission efficiency of a PON. In view of this, an embodiment of the present application provides a method for managing an ONU in a passive optical network. As shown in FIG. 3, the method includes the steps described below.

In step 302, a first quiet window and a second quiet window are determined.

In step 303, the first quiet window is allocated to an ONU within a first preset distance range, and the second quiet window is allocated to an ONU within a second preset distance range.

The distance between an optical line terminal (OLT) and the ONU within the first preset distance range is less than the distance between the OLT and the ONU within the second preset distance range.

Here, the first quiet window is used for registration of the ONU within the first preset distance range, and the second quiet window is used for registration of the ONU within the second preset distance range.

According to this embodiment of the present application, ONUs within different distance ranges are allocated corresponding quiet windows for registration, and these quiet windows satisfy both the loop delay of the ONU farthest from the OLT and the loop delay of the ONU closest to the OLT. Such configuration reduces the uplink bandwidth, and thereby, improves the uplink transmission efficiency of the PON. Meanwhile, the OLT can manage farther ONUs so that efficiency of the OLT and cost performance of the PON system are improved.

In this embodiment, the size of the quiet window may be understood as a duration of the quiet window. For example, the size of the first quiet window may be a duration of the first quiet window, and a duration of the second quiet window may include the duration of the second quiet window. In this embodiment, the duration of the first quiet window may be less than the duration of the second quiet window.

In this embodiment of the present application, the start time of the first quiet window is T1+the minimum response time of the ONU within the first preset distance range.

T1 is the start time of sending uplink data by the ONU within the first preset distance range.

In this embodiment of the present application, the start time of the second quiet window is T2+the minimum response time of the ONU within the second preset distance range+a loop delay between the OLT and a range extender (RE)+an RE response time.

T2 is the start time of sending uplink data by the ONU within the second preset distance range, the RE is disposed between a first optical splitter and a second optical splitter, the first optical splitter is disposed between the OLT and the ONU within the first preset distance range, and the second optical splitter is disposed between the first optical splitter and the ONU within the second preset distance range.

Alternatively, the start time of the second quiet window is T2+the minimum response time of the ONU within the second preset distance range+a loop delay between the OLT and N range extenders (REs)+an RE response time.

N is an integer greater than or equal to 1, T2 is the start time of sending uplink data by the ONU within the second preset distance range, the REs are disposed between the OLT and a third optical splitter, and the third optical splitter is disposed between the REs and the ONU within the second preset distance range.

In this embodiment of the present application, the size of the first quiet window or the second quiet window is the maximum loop delay difference between the OLT and the ONU+the maximum response time difference of the ONU+the maximum random delay of the ONU.

Alternatively, the size of the second quiet window is the maximum loop delay difference between the REs and the ONU+the maximum response time difference of the ONU+the maximum random delay of the ONU+the maximum loop delay difference between the OLT and the REs.

The maximum loop delay difference between the OLT and the ONU is the difference between a loop delay between the OLT and the ONU farthest from the OLT and a loop delay between the OLT and the ONU closest to the OLT.

The maximum loop delay difference between the REs and the ONU is the difference between a loop delay between the ONU and the RE farthest from the ONU and a loop delay between the ONU and the RE closest to the ONU.

The maximum loop delay difference between the OLT and the REs is the difference between a loop delay between the OLT and the RE farthest from the OLT and a loop delay between the OLT and the RE closest to the OLT.

Figure 4:
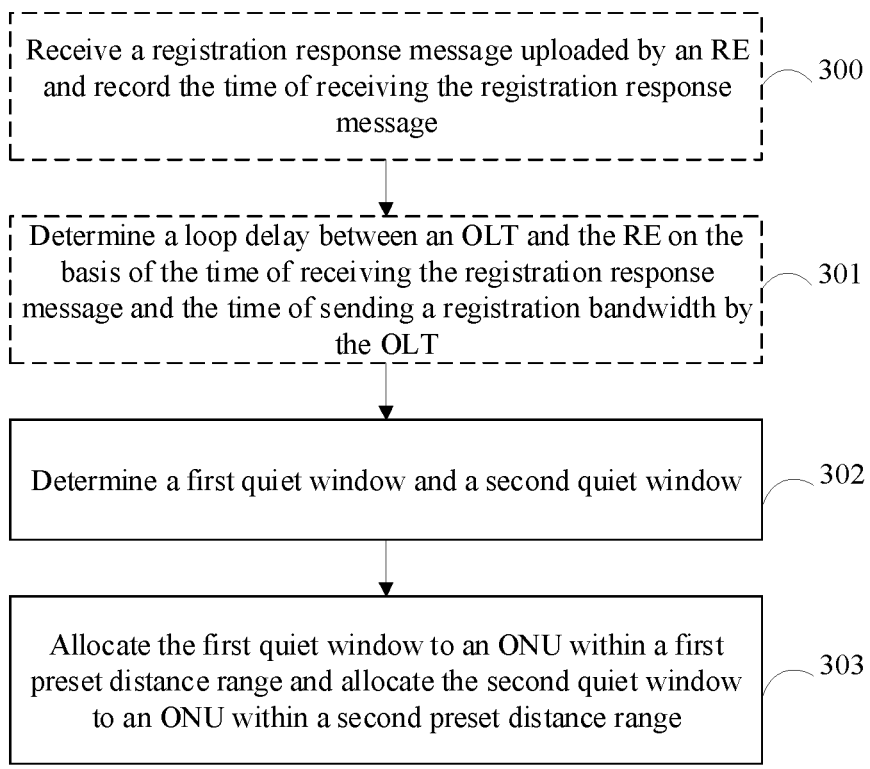
FIG. 4 is flowchart 2 of a method for managing an ONU in a passive optical network according to an embodiment of the present application.

In an embodiment, as shown in FIG. 4, before the step of allocating the first quiet window and the second quiet window, the method further includes the steps described below.

In step 300, a registration response message uploaded by the RE is received, and the time of receiving the registration response message is recorded.

In step 301, the loop delay between the OLT and the RE is determined on the basis of the time of receiving the registration response message and the time of sending a registration bandwidth by the OLT.

In this embodiment of the present application, the registration bandwidth is a registration request.

Here, the loop delay between the OLT and the RE is the time of receiving the registration response message by the RE−the time of sending the registration bandwidth by the OLT−an RE response time−the start time of sending the uplink data by the RE.

Figure 5:
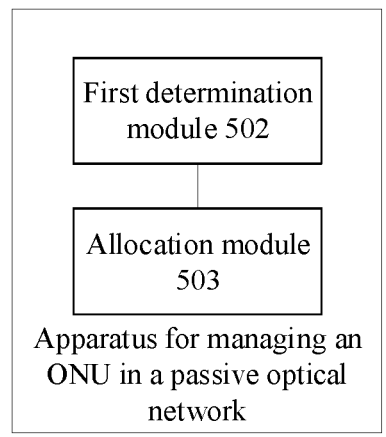
FIG. 5 is structure diagram 1 of an apparatus for managing an ONU in a passive optical network according to an embodiment of the present application.

An embodiment of the present application further provides an OLT. The OLT includes an apparatus for managing an ONU in a passive optical network to implement the preceding embodiments. What has been described will not be repeated. As used below, the term "module" may be software, hardware or a combination thereof capable of implementing predetermined functions. As shown in FIG. 5, the apparatus includes a determination module 502 and an allocation module 503.

The determination module 502 (that is, a first determination module 502) is configured to determine a first quiet window and a second quiet window.

The allocation module 503 is configured to allocate the first quiet window to an ONU within a first preset distance range and allocate the second quiet window to an ONU within a second preset distance range.

The distance between an optical line terminal (OLT) and the ONU within the first preset distance range is less than the distance between the OLT and the ONU within the second preset distance range.

Here, the first quiet window is used for registration of the ONU within the first preset distance range, and the second quiet window is used for registration of the ONU within the second preset distance range.

According to this embodiment of the present application, ONUs within different distance ranges are allocated corresponding quiet windows for registration, and these quiet windows satisfy both a loop delay of the ONU farthest from the OLT and a loop delay of the ONU closest to the OLT. Such configuration reduces an uplink bandwidth, and thereby, improves uplink transmission efficiency of a PON. Meanwhile, the OLT can manage farther ONUs so that efficiency of the OLT and cost performance of a PON system are improved.

In this embodiment of the present application, the start time of the first quiet window is T1+the minimum response time of the ONU within the first preset distance range.

T1 is the start time of sending uplink data by the ONU within the first preset distance range.

In this embodiment of the present application, the start time of the second quiet window is T2+the minimum response time of the ONU within the second preset distance range+a loop delay between the OLT and a range extender (RE)+an RE response time.

T2 is the start time of sending uplink data by the ONU within the second preset distance range, the RE is disposed between a first optical splitter and a second optical splitter, the first optical splitter is disposed between the OLT and the ONU within the first preset distance range, and the second optical splitter is disposed between the first optical splitter and the ONU within the second preset distance range.

Alternatively, the start time of the second quiet window is T2+the minimum response time of the ONU within the second preset distance range+the minimum loop delay between the OLT and N range extenders (REs)+an RE response time.

N is an integer greater than or equal to 1, T2 is the start time of sending uplink data by the ONU within the second preset distance range, the REs are disposed between the OLT and a third optical splitter, and the third optical splitter is disposed between the REs and the ONU within the second preset distance range.

In this embodiment of the present application, the size of the first quiet window or the second quiet window is the maximum loop delay difference between the OLT and the ONU+the maximum response time difference of the ONU+the maximum random delay of the ONU.

Alternatively, the size of the second quiet window is the maximum loop delay difference between the REs and the ONU+the maximum response time difference of the ONU+the maximum random delay of the ONU+the maximum loop delay difference between the OLT and the REs.

The maximum loop delay difference between the OLT and the ONU is the difference between a loop delay between the OLT and the ONU farthest from the OLT and a loop delay between the OLT and the ONU closest to the OLT.

The maximum loop delay difference between the REs and the ONU is the difference between a loop delay between the ONU and the RE farthest from the ONU and a loop delay between the ONU and the RE closest to the ONU.

The maximum loop delay difference between the REs and the OLT is the difference between a loop delay between the OLT and the RE farthest from the OLT and a loop delay between the OLT and the RE closest to the OLT.

Figure 6:
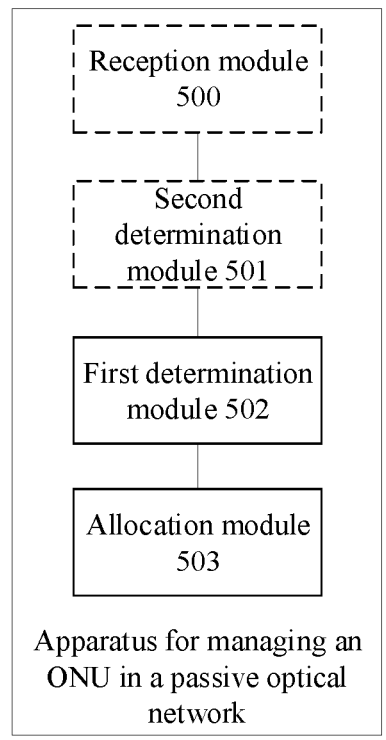
FIG. 6 is structure diagram 2 of an apparatus for managing an ONU in a passive optical network according to an embodiment of the present application.

In an embodiment, as shown in FIG. 6, the apparatus further includes a reception module 500 and a determination module 501.

The reception module 500 is configured to receive a registration response message uploaded by the RE and record the time of receiving the registration response message.

The determination module 501 (that is, a second determination module 501) is configured to determine the loop delay between the OLT and the RE on the basis of the time of receiving the registration response message and the time of sending a registration bandwidth by the OLT.

An embodiment of the present disclosure further provides an optical line terminal (OLT). The OLT includes a processor, and a memory configured to store a computer program executable by the processor.

The processor is configured to perform the steps described below when executing the computer program.

A first quiet window and a second quiet window are determined.

The first quiet window is allocated to an ONU within a first preset distance range and the second quiet window is allocated to an ONU within a second preset distance range.

The distance between an optical line terminal (OLT) and the ONU within the first preset distance range is less than the distance between the OLT and the ONU within the second preset distance range.

In some embodiments, the processor is further configured to perform the steps described below when executing the computer program.

Before the step of determining the first quiet window and the second quiet window, the processor performs the steps described blow.

A registration response message uploaded by an RE is received, and the time of receiving the registration response message is recorded.

A loop delay between the OLT and the RE is determined on the basis of the time of receiving the registration response message and the time of sending a registration bandwidth by the OLT.

An embodiment of the present application further provides a system for managing an ONU in a passive optical network. The system includes an optical line terminal (OLT), an ONU within a first preset distance range, and an ONU within a second preset distance range, where the OLT is the preceding OLT. The system further includes a range extender (RE).

The RE is disposed between a first optical splitter and a second optical splitter, where the first optical splitter is disposed between the OLT and an ONU within the first preset distance range, and the second optical splitter is disposed between the RE and the ONU within the second preset distance range.

Figure 7:
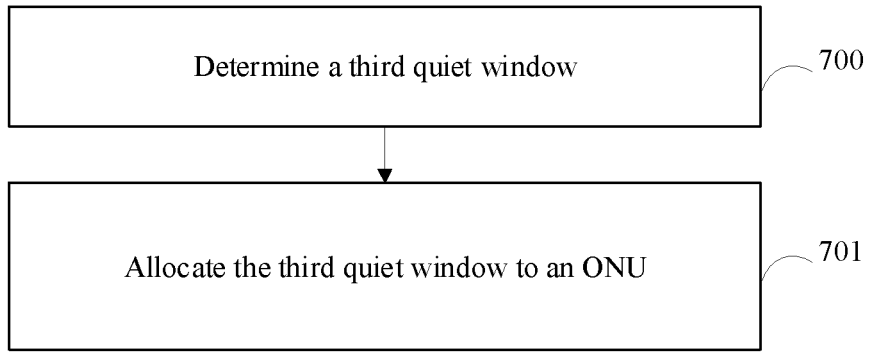
FIG. 7 is flowchart 3 of a method for managing an ONU in a passive optical network according to an embodiment of the present application.

An embodiment of the present application provides a method for managing an ONU in a passive optical network. As shown in FIG. 7, the method includes the steps described below.

In step 700, a third quiet window is determined.

In step 701, the third quiet window is allocated to the ONU.

The start time of the third quiet window is T3+the minimum response time of the ONU+the minimum loop delay between an optical line terminal (OLT) and N range extenders (REs)+an RE response time.

N is an integer greater than or equal to 1, T3 is the start time of sending uplink data by the ONU, the REs are disposed between the OLT and a third optical splitter, and the third optical splitter is disposed between the REs and the ONU.

According to this embodiment of the present application, the start time of the quiet window allocated to the ONU depends on the minimum loop delay between the OLT and the N REs instead of T3+the minimum response time of the ONU so that an uplink bandwidth is reduced, and thereby, uplink transmission efficiency of a PON is improved.

In this embodiment of the present application, the size of the third quiet window is the maximum loop delay difference between the REs and the ONU+the maximum response time difference of the ONU+the maximum random delay of the ONU+the maximum loop delay difference between the OLT and the REs.

The maximum loop delay difference between the REs and the ONU is the difference between a loop delay between the ONU and the RE farthest from the ONU and a loop delay between the ONU and the RE closest to the ONU.

The maximum loop delay difference between the OLT and the REs is the difference between a loop delay between the OLT and the RE farthest from the OLT and a loop delay between the OLT and the RE closest to the OLT.

In some embodiments, before the step of allocating the third quiet window to the ONU, the method further includes the steps described below.

Registration response messages uploaded by the REs are received, and times of receiving the registration response messages are recorded.

Loop delays between the OLT and the REs are determined on the basis of the times of receiving the registration response messages and the time of sending a registration bandwidth by the OLT.

Here, the loop delay between the OLT and each RE is the time of receiving the registration response message by each RE−the time of sending the registration bandwidth by the OLT−each RE response time−the start time of sending the uplink data by each RE.

Figure 8:
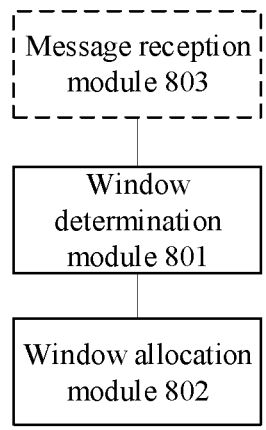
FIG. 8 is a structure diagram of an OLT according to an embodiment of the present application.

As shown in FIG. 8, an embodiment of the present application provides an OLT. The OLT includes a window determination module 801 and a window allocation module 802

The window determination module 801 is configured to determine a third quiet window.

The window allocation module 802 is configured to allocate the third quiet window to an ONU.

The start time of the third quiet window is T3+the minimum response time of the ONU+the minimum loop delay between an optical line terminal (OLT) and N range extenders (REs)+an RE response time.

N is an integer greater than or equal to 1, T3 is the start time of sending uplink data by the ONU, the REs are disposed between the OLT and a third optical splitter, and the third optical splitter is disposed between the REs and the ONU.

In some embodiments of the present application, the size of the third quiet window is the maximum loop delay difference between the REs and the ONU+the maximum response time difference of the ONU+the maximum random delay of the ONU+the maximum loop delay difference between the OLT and the REs.

In some embodiments, the OLT further includes a message reception module 803.

The message reception module 803 is configured to receive registration response messages uploaded by the REs and record times of receiving the registration response messages.

The window determination module 801 is further configured in the manner described below.

The window determination module 801 determines loop delays between the OLT and the REs on the basis of the times of receiving the registration response messages and the time of sending a registration bandwidth by the OLT.

An embodiment of the present application provides an OLT. The OLT includes a processor and a computer-readable storage medium, where the computer-readable storage medium stores instructions, and any one of the preceding methods for managing an optical network unit (ONU) in a passive optical network is performed when the processor executes the instructions.

An embodiment of the present disclosure provides a system for managing an optical network unit (ONU) in a passive optical network. The system includes any one of the preceding OLTs, the ONU and a range extender (RE).

The RE is disposed between the any one of the preceding OLTs and a third optical splitter, where the third optical splitter is disposed between the RE and the any one of the preceding ONUs.

Figure 9:
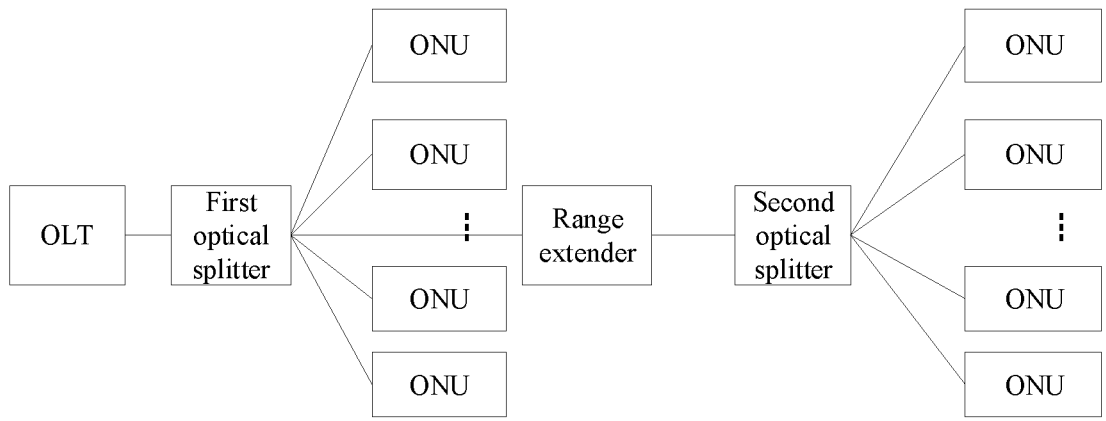
FIG. 9 is topology diagram 1 of a passive optical network with an extended ONU range according to an embodiment of the present application.

In an embodiment of the present application, an OLT needs to manage farther ONUs. As shown in FIG. 9, when the different between a path loss for an ONU closest to the OLT and a path loss for an ONU farthest to the OLT is greater than 15 dB, it is necessary to add a range extender to a PON system. The range extender amplifies an uplink optical signal and a downlink optical signal passing through the range extender and is configured to compensate for a path loss of an ONU farther from the OLT so that an optical power difference is less than 15 dBm between an uplink optical signal sent by the ONU closest to the OLT and an uplink optical signal sent by the ONU farthest from the OLT when the uplink optical signals reach the OLT.

FIG. 9 shows the topology of the PON system added with the range extender. An ONU closer to the OLT is connected to a first optical splitter. The ONU farther from the OLT is connected to a second optical splitter. The second optical splitter is connected to the range extender. The range extender is connected to a branch fiber of the first optical splitter. The first optical splitter is connected to the OLT. The function of the range extender is to amplify an input optical signal in the manner of photoelectric light, adding an amplifier or the like. Moreover, the range extender can tune the range of output optical power as follows. In a downlink direction, the downlink optical signal sent by the OLT enters the range extender, and the range extender amplifies and outputs the downlink optical signal; the range extender sets an optical power value of the output downlink optical signal of the range extender according to the length of an fiber from the range extender to the second optical splitter and an accumulated loss value of optical splitting ratio of the second optical splitter so that an optical power value (the optical power value of the output downlink optical signal of the range extender minus the preceding accumulated loss value) of the downlink optical signal that reaches the ONU is within a standard range of received optical power of the ONU, that is, greater than a receiving sensitivity of the ONU and less than overload optical power of the ONU. In an uplink direction, the uplink optical signal sent by the ONU enters the range extender, and the range extender amplifies and outputs the uplink optical signal; the range extender sets optical power of the output uplink optical signal of the range extender according to the distance of the fiber from the range extender to the second optical splitter and the accumulated loss value of the optical splitting ratio of the second optical splitter so that the optical power of the output uplink optical signal of the range extender is within a standard range of transmission optical power of the ONU.

Figure 13:
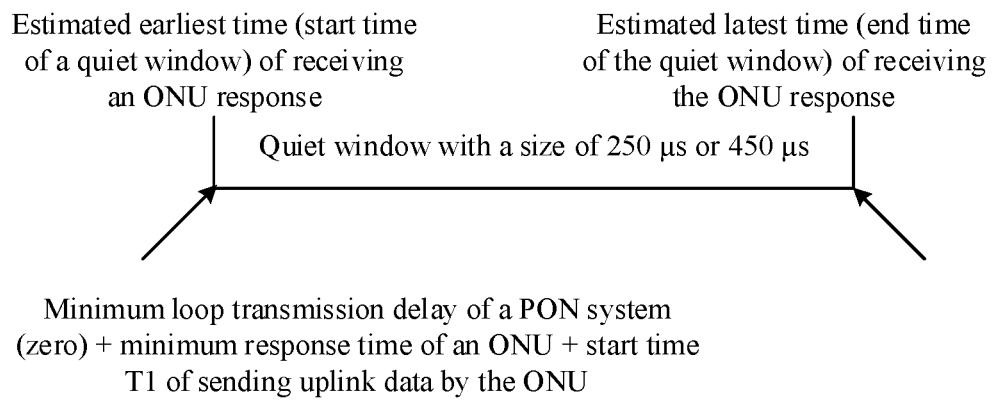
FIG. 13 is a schematic diagram of a quiet window used for registration of an ONU connected to a first optical splitter according to an embodiment of the present application.
Figure 14:
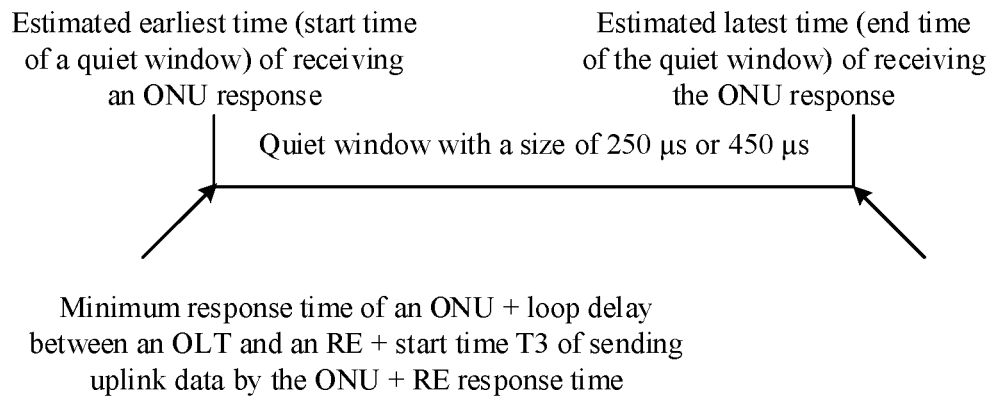
FIG. 14 is a schematic diagram of a quiet window used for registration of an ONU connected to a third optical splitter or a fourth optical splitter according to an embodiment of the present application.
Figure 15:
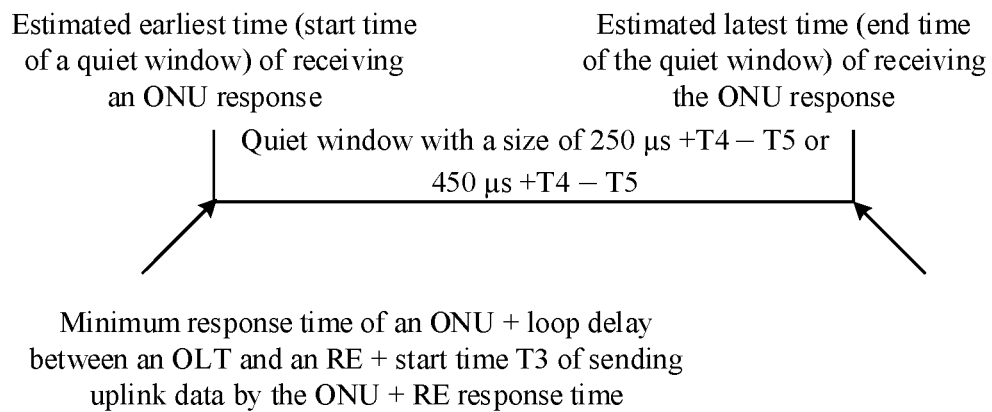
FIG. 15 is a schematic diagram of a quiet window used for registration of an ONU connected to a fifth optical splitter or a sixth optical splitter according to an embodiment of the present application.

In the preceding PON topology, the OLT opens a standard quiet window for registration of the ONU directly connected to the first optical splitter. As shown in FIG. 13, the earliest time of receiving a response message of the ONU by the OLT in the quiet window (the start time of the quiet window) depends on the following three parts: the minimum loop transmission delay of the PON system (assumed zero here)+the minimum response time of the ONU+the start time of sending uplink data by the ONU (T1 as described above). The size of the quiet window is mainly depends on the maximum loop delay difference of the PON system+the maximum response time difference of the ONU+the maximum random delay of the ONU. For a PON system supporting a differential distance of 20 km, a standard recommends a loop delay difference value of 200 microseconds (µs) between the ONU closest to the OLT and the ONU farthest to the OLT, a maximum response time difference of 2 µs of the ONU, and a maximum random time delay of 48 µs of the ONU, so the quiet window has a recommended size of 250 µs. For a PON system supporting a differential distance of 40 km, the standard recommends a loop delay difference value of 400 microseconds (µs) between the ONU closest to the OLT and the ONU farthest to the OLT, a maximum response time difference of 2 µs of the ONU, and a maximum random time delay of 48 μs of the ONU, so the quiet window has a recommended size of 450 μs. Therefore, the start time used for sending uplink data and allocated by the OLT to the ONU directly connected to the first optical splitter is T1, and the OLT prepares to open the quiet window at a time (the start time of the quiet window) corresponding to T1+the minimum response time of the ONU and receive the response message of the ONU. The opened quiet window has a size of 250 μs (corresponding to the PON system with a differential distance of 20 km) or 450 μs (corresponding to the PON system with a differential distance of 40 km).

The start time used for sending uplink data and allocated by the OLT to the ONU connected to the second optical splitter is T2, and the OLT prepares to open the quiet window at a time corresponding to T2+the minimum response time of the ONU+an RE response time+a loop delay between the OLT and the second optical splitter and receive the response message of the ONU. The opened quiet window has a size of 250 μs (corresponding to the PON system with a differential distance of 20 km) or 450 μs (corresponding to the PON system with a differential distance of 40 km).

The OLT allocates (broadcasts) each unregistered ONU a bandwidth for responding to a registration request and opens the two quiet windows for each unregistered ONU. After receiving the bandwidth for registration allocated by the OLT, the ONU sends a serial number message over the preceding bandwidth to respond to the registration request of the OLT. After receiving the preceding message of the ONU, the OLT allocates an ONU identifier to the ONU and performs ranging, and thus, the ONU finishes the registration.

Figure 10:
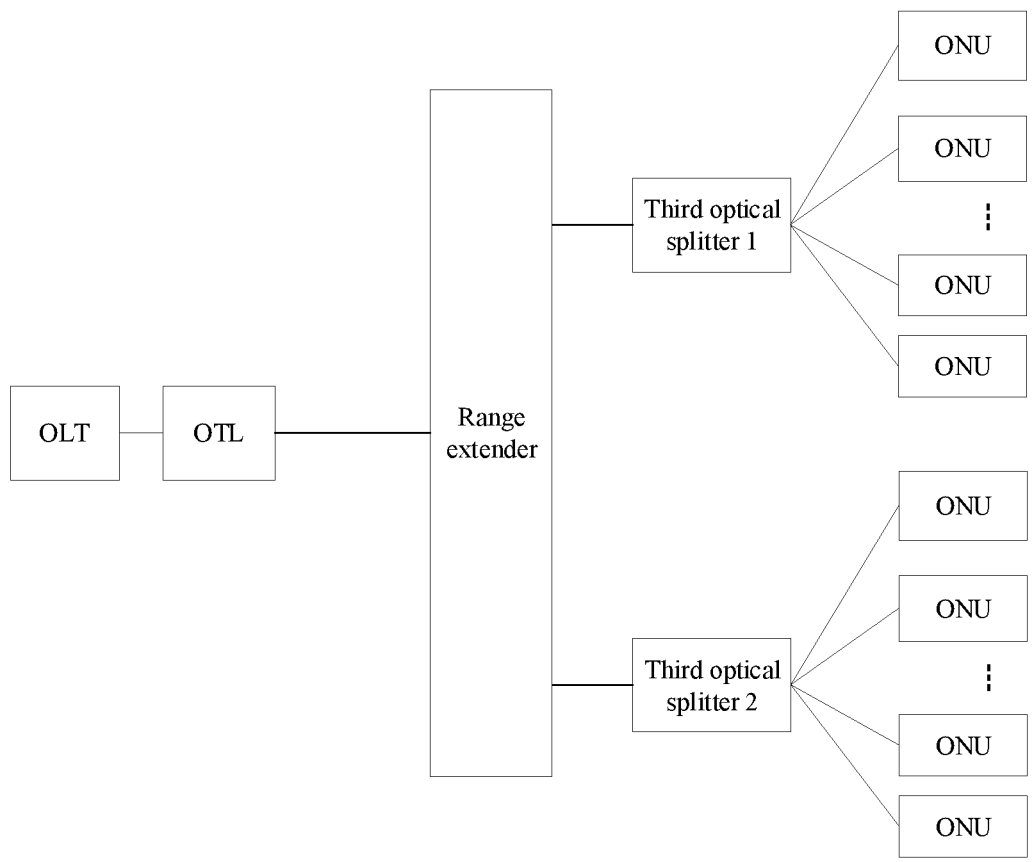
FIG. 10 is topology diagram 2 of a passive optical network with an extended ONU range according to an embodiment of the present application.

In an embodiment of the present application, an OLT needs to manage farther ONUs. As shown in FIG. 10, when an ONU has a path loss greater than 15 dB, it is necessary to add a range extender to a PON system. The range extender amplifies an uplink optical signal and a downlink optical signal passing through the range extender. The path loss of the ONU makes the uplink optical signal sent by the ONU have optical power less than 15 dBm when the uplink optical signal reaches the OLT.

FIG. 10 shows the topology of the PON system added with the range extender. The ONU is connected to third optical splitter 1 or third optical splitter 2. Third optical splitter 1 and third optical splitter 2 are each connected to the range extender. Moreover, the distance is 0 km to 20 km, or 0 km to 40 km between the RE and an ONU connected to the RE. The range extender is connected to the OLT through an optical transmission link (OTL). The function of the range extender is to amplify an input optical signal in the manner of photoelectric light, adding an amplifier or the like. Moreover, the range extender can tune the range of output optical power as follows. In a downlink direction, the downlink optical signal sent by the OLT enters the range extender, and the range extender amplifies and outputs the downlink optical signal; the range extender sets an optical power value of the output downlink optical signal of the range extender according to the length of an fiber from the range extender to third optical splitter 1 (or third optical splitter 2) and an accumulated loss value of optical splitting ratio of third optical splitter 1 (or third optical splitter 2) so that an optical power value (the optical power value of the output downlink optical signal of the range extender minus the preceding accumulated loss value) of the downlink optical signal that reaches the ONU is within a standard range of received optical power of the ONU, that is, greater than a receiving sensitivity of the ONU and less than overload optical power of the ONU. In an uplink direction, the uplink optical signal sent by the ONU enters the range extender, and the range extender amplifies and outputs the uplink optical signal; the range extender sets optical power of the output uplink optical signal of the range extender according to the distance of the fiber from the range extender to third optical splitter 1 (or third optical splitter 2) and the accumulated loss value of the optical splitting ratio of third optical splitter 1 (or third optical splitter 2) so that the optical power of the output uplink optical signal of the range extender is within a standard range of transmission optical power of the ONU.

In the preceding PON topology, the start time used for sending uplink data and allocated by the OLT to each ONU connected to the third optical splitter or a fourth optical splitter is T3, and the OLT prepares to open the quiet window at a time corresponding to T3+the minimum response time of the ONU+an RE response time+a loop delay between the OLT and the RE and receive a response message of the ONU. The opened quiet window has a size of 250 μs (corresponding to a PON system with the differential distance of 0 km to 20 km) or 450 μs (corresponding to a PON system with the differential distance of 0 km to 40 km).

The OLT allocates (broadcasts) each unregistered ONU a bandwidth for responding to a registration request and opens the two quiet windows for each unregistered ONU. After receiving the bandwidth for registration allocated by the OLT, the ONU sends a serial number message over the preceding bandwidth to respond to the registration request of the OLT. After receiving the preceding message of the ONU, the OLT allocates an ONU identifier to the ONU and performs ranging, and thus, the ONU finishes the registration.

Figures 11, 12:
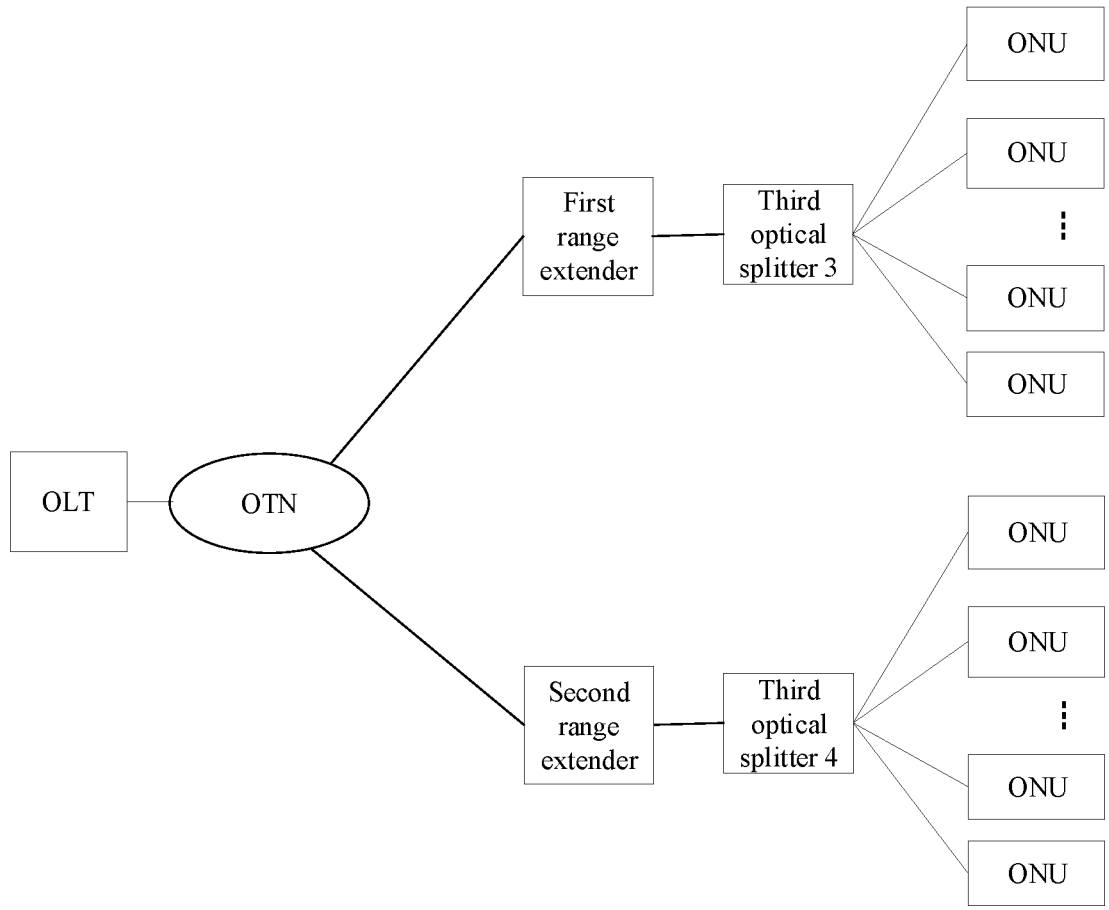
FIG. 11 is topology diagram 3 of a passive optical network with an extended ONU range according to an embodiment of the present application.
FIG. 12 is a schematic diagram of a quiet window used for registration of an ONU connected to a second optical splitter according to an embodiment of the present application.

In an embodiment of the present application, an OLT needs to manage farther ONUs. As shown in FIG. 11, when an ONU has a path loss greater than 15 dB, it is necessary to add a range extender in a PON system. The range extender amplifies an uplink optical signal and a downlink optical signal passing through the range extender. The path loss of the ONU makes the uplink optical signal sent by the ONU have optical power less than 15 dBm when the uplink optical signal reaches the OLT.

FIG. 11 shows the topology of the PON system added with the range extender. The ONU is connected to third optical splitter 3 or third optical splitter 4. Third optical splitter 3 is connected to a first range extender, and third optical splitter 4 is connected to a second range extender. Moreover, the distance is 0 km to 20 km, or 0 km to 40 km between the first RE and an ONU connected to the first RE, and the distance is 0 km to 20 km, or 0 km to 40 km between the second RE and an ONU connected to the second RE. The first range extender and the second range extender are connected to the OLT through an optical transport network (OTN). The function of the range extender is to amplify an input optical signal in the manner of photoelectric light, adding an amplifier or the like. Moreover, the range extender can tune the range of output optical power as follows. In a downlink direction, the downlink optical signal sent by the OLT enters the first range extender and the second range extender, and the first range extender (or the second range extender) amplifies and outputs the downlink optical signal; the first range extender (or the second range extender) sets an optical power value of the output downlink optical signal of the range extender according to the length of an fiber from the first range extender (or the second range extender) to third optical splitter 3 (or third optical splitter 4) and an accumulated loss value of optical splitting ratio of third optical splitter 3 (or third optical splitter 4) so that an optical power value (the optical power value of the output downlink optical signal of the first range extender (or the second range extender) minus the preceding accumulated loss value) of the downlink optical signal that reaches the ONU is within a standard range of received optical power of the ONU, that is, greater than a receiving sensitivity of the ONU and less than overload optical power of the ONU. In an uplink direction, the uplink optical signal sent by the ONU enters the first range extender (or the second range extender), and the first range extender (or the second range extender) amplifies and outputs the uplink optical signal; the first range extender (or the second range extender) sets optical power of the output uplink optical signal of the first range extender (or the second range extender) according to the distance of the fiber from the first range extender (or the second range extender) to third optical splitter 3 (or third optical splitter 4) and the accumulated loss value of the optical splitting ratio of third optical splitter 3 (or third optical splitter 4) so that the optical power of the output uplink optical signal of the first range extender (or the second range extender) is within a standard range of transmission optical power of the ONU.

In the preceding PON topology, the OLT opens a quiet window for registration of each ONU connected third optical splitter 3 and third optical splitter 4. As shown in FIGS. 12 to 15, the earliest time (the start time of the quiet window) of receiving a response message of the ONU by the OLT in the quiet window depends on the minimum response time of the ONU+the minimum loop delay between the OLT and the RE+start time T3 of sending uplink data by the ONU+an RE response time. The size of the quiet window is mainly depends on the maximum loop delay difference between the RE and the ONU+the maximum response time difference of the ONU+the maximum random delay of the ONU+the maximum loop delay difference between the OLT and the RE.

For a PON system supporting a distance of 0 km to 20 km between the RE and the ONU connected to the RE, a loop delay difference (that is, the maximum loop delay difference between the RE and the ONU) is 200 microseconds (µs) between the ONU closest to the RE and the ONU farthest from the RE, the maximum response time difference of the ONU is 2 µs, the maximum random delay of the ONU is 48 µs, and the maximum loop delay difference between the OLT and the RE is T4−T5, so the quiet window has a size of 250 µs+T4−T5. T4 is the maximum value of a loop delay between the OLT and the first RE and a loop delay between the OLT and the second RE. T5 is the minimum value of the loop delay between the OLT and the first RE and the loop delay between the OLT and the second RE.

For a PON system supporting a distance of 0 km to 40 km between the RE and the ONU connected to the RE, a loop delay difference (that is, the maximum loop delay difference between the RE and the ONU) is 400 µs between the ONU closest to the RE and the ONU farthest from the RE, the maximum response time difference of the ONU is 2 µs, the maximum random delay of the ONU is 48 µs, and the maximum loop delay difference between the OLT and the RE is T4−T5, so the quiet window has a size of 450 µs+T4−T5.

Therefore, the start time used for sending uplink data and allocated by the OLT to each ONU connected to third optical splitter 3 or third optical splitter 4 is T3, and the OLT prepares to open the quiet window at a time corresponding to T3+the minimum response time of the ONU+an RE response time+the minimum value of the loop delay between the OLT and the first RE+the loop delay between the OLT and the second RE and receive the response message of the ONU. The opened quiet window has a size of 250 µs (corresponding to the PON system in which the distance between the RE and the ONU connected to the RE is 0 km to 20 km) or 450 µs (corresponding to the PON system in which the distance between the RE and the ONU connected to the RE is 0 km to 40 km).

The OLT allocates (broadcasts) each unregistered ONU a bandwidth for responding to a registration request and opens the two quiet windows for each unregistered ONU. After receiving the bandwidth for registration allocated by the OLT, the ONU sends a serial number message over the preceding bandwidth to respond to the registration request of the OLT. After receiving the preceding message of the ONU, the OLT allocates an ONU identifier to the ONU and performs ranging, and thus, the ONU finishes the registration.

In some embodiments, an OLT can obtain the length of an fiber from an OLT to a second optical splitter in advance, so the OLT can calculate a loop delay of an optical signal from the OLT to the second optical splitter. In the scenario of this embodiment, the OLT cannot obtain the length of the fiber described above. The OLT, an RE and an ONU complete registration of each ONU through the steps described below.

In step 1, after the RE is connected to a PON system, the OLT sends a registration bandwidth for ONU and RE registration and allocates a registered ONU no uplink bandwidth for sending uplink data.

In step 2, after receiving the registration bandwidth, the RE sends a response message to the OLT to notify the OLT of the RE.

In step 3, after the OLT receives the response message of the RE, the distance of the fiber from the OLT to the RE can be calculated according to the time of sending the registration bandwidth (downlink data) by the OLT in step 1 and the time of receiving the response message of the RE by the OLT.

Specifically, a loop delay between the OLT and the RE is calculated according to the time of sending the registration bandwidth by the OLT and the time of receiving the response message of the RE, and the distance of the fiber from the OLT to the RE is calculated according to the loop delay between the OLT and the RE.

The loop delay between the OLT and the RE is the time of receiving a registration response message by the RE−the time of sending the registration bandwidth by the OLT−an RE response time−the start time of sending the uplink data by the RE.

The distance of the fiber from the OLT to the RE is half the product of the loop delay between the OLT and the RE and the transmission speed of light in the fiber.

In step 4, the OLT opens a standard quiet window for registration of an ONU directly connected to a first optical splitter. As shown in FIG. 9, the start time used for sending the uplink data and allocated by the OLT to the ONU directly connected to the first optical splitter is T1, and the OLT prepares to open the quiet window at a time corresponding to T1+the minimum response time of the ONU and receive a response message of the ONU. The opened quiet window has a size of 250 µs (corresponding to a PON system with a differential distance of 20 km) or 450 µs (corresponding to a PON system with a differential distance of 40 km).

In step 5, as shown in FIG. 8, the start time used for sending the uplink data and allocated by the OLT to an ONU connected to a second optical splitter is T2, and the OLT prepares to open the quiet window at a time corresponding to T2+the minimum response time of the ONU+the loop delay between the OLT and the RE+an RE response time and receive the response message of the ONU. The opened quiet window has a size of 250 μs (corresponding to the PON system with a differential distance of 20 km) or 450 μs (corresponding to the PON system with a differential distance of 40 km).

The OLT allocates (broadcasts) each unregistered ONU a bandwidth for responding to a registration request and opens the two quiet windows for each unregistered ONU. After receiving the bandwidth for registration allocated by the OLT, the ONU sends a serial number message over the preceding bandwidth to respond to the registration request of the OLT. After receiving the preceding message of the ONU, the OLT allocates an ONU identifier to the ONU and performs ranging, and thus, the ONU finishes the registration.

This embodiment gives the case of separately opening windows to save an uplink bandwidth when each segment of the fiber in a PON has a known distance.

An OLT can obtain in advance that an fiber from the OLT to an RE has a 40 km length, an ONU connected to a first optical splitter has a differential distance of 20 km, and an ONU connected to a second optical splitter has a differential distance of 20 km. The OLT, the RE and an ONU complete registration of each ONU through the steps described below.

In step 1, the OLT opens a standard quiet window for registration of the ONU directly connected to a first optical splitter. As shown in FIG. 9, the start time used for sending uplink data and allocated by the OLT to the ONU directly connected to the first optical splitter is T1, and the OLT prepares to open the quiet window at a time corresponding to T1+the minimum response time of the ONU and receive a response message of the ONU. The opened quiet window has a size of 250 μs (corresponding to a PON system with a differential distance of 20 km). This window is configured to receive a registration message of an ONU 0 km to 20 km from the OLT.

In step 2, the start time T2 used for sending the uplink data and allocated by the OLT to the ONU connected to the second optical splitter is T2, and the OLT prepares to open the quiet window at a time corresponding to T2+the minimum response time of the ONU+a loop delay of an 40 km fiber+an RE response time and receive the response message of the ONU. The opened quiet window has a size of 250 μs (corresponding to the PON system with a differential distance of 20 km). This window is configured to receive a registration message of an ONU 40 km to 60 km from the OLT.

The OLT allocates (broadcasts) each unregistered ONU a bandwidth for responding to a registration request and opens the two quiet windows for each unregistered ONU. After receiving the bandwidth for registration allocated by the OLT, the ONU sends a serial number message over the preceding bandwidth to respond to the registration request of the OLT. After receiving the preceding message of the ONU, the OLT allocates an ONU identifier to the ONU and performs ranging, and thus, the ONU finishes the registration.

In this embodiment, the OLT allocates two quiet windows to ONUs within different distance ranges, where one quiet window is configured to receive the registration message of the ONU that has a distance of 0 km to 20 km, and the other quiet window is configured to receive the registration message of the ONU that has a distance of 40 km to 60 km. In this way, the time of the quiet window for the ONU that has a distance of 20 km to 40 km is saved.

As shown in FIG. 10, to share an OLT and an OTL, one OLT needs to manage ONUs in multiple ODNs. In the related art, when the OLT opens a quiet window, assuming that the ONU closest to the OTL is 0 km from the OTL and the ONU farthest from the OTL is 20 km or 40 km from the OTL, the OLT calculates the start time of the quiet window according to the time of sending a response message to the OTL by the ONU 0 km from the OTL, and calculates the end time of the quiet window according to the time of sending a response message to the OTL by the ONU 20 km or 40 km from the OTL. In FIG. 10, in a long-range PON system, if the OLT calculates the start time of the quiet window according to the time of sending the response message to the OTL by the ONU 0 km from the OTL, the OTL opens a large quiet window, and the uplink bandwidth is wasted.

In view of this, this embodiment provides the steps described below.

In the process of deploying a fiber distribution network of a PON, an RE is required to be 0 km to 20 km, or 0 km to 40 km from an ONU connected to the RE. The OLT opens the quiet window through the steps described below.

In step 1, after the RE is connected to a PON system, the OLT sends a registration bandwidth for ONU and RE registration and allocates a registered ONU no uplink bandwidth for sending uplink data.

In step 2, after receiving the preceding registration bandwidth, the RE sends a response message to the OLT, where the response message contains specific serial number information that is used for identifying the RE.

In step 3, after the OLT receives the response message of the RE, a loop delay between the OLT and the RE can be calculated according to the time of sending the registration bandwidth (downlink data) by the OLT in step 1 and the time of receiving the response message of the RE by the OLT.

In step 4, the start time used for sending uplink data and allocated by the OLT to the registered ONU is T3, and the OLT prepares to open the quiet window at a time corresponding to T3+the loop delay between the OLT and the RE and receive a response message of the ONU. The opened quiet window has a size of 250 μs (corresponding to a PON system in which the distance between an RE and an ONU connected to the RE is 0 km to 20 km) or 450 μs (corresponding to a PON system with the differential distance of 0 km to 40 km).

As shown in FIG. 11, to share an OLT and an OTN, one OLT needs to manage ONUs connected to multiple ODNs (that is, a fifth optical splitter and a sixth optical splitter). An fiber between the OLT and an ONU connected to any one ODN may have a differential distance greater than 20 km or 40 km. In the related art, the size of a quiet window opened by OLT for registration of the ONU is suitable for the fiber with a differential distance less than or equal to 20 km, or less than or equal to 40 km. If the fiber between the OLT and the ONU connected to any one ODN has a differential distance greater than 20 km or 40 km, there is a collision between an uplink frame sent by a registered ONU and an uplink frame generated by the ONU in an operating state. Moreover, in the related art, when the OLT opens the quiet window, assuming that the ONU closest to the OTL is 0 k from the OTL and the ONU farthest from the OTL is 20 km or 40 km from the OTL, the OLT calculates the start time of the quiet window according to the time of sending a response message to the OTL by the ONU 0 km from the OTL, and calculates the end time of the quiet window according to the time of sending a response message to the OTL by the ONU 20 km or 40 km from the OTL. In FIG. 11, in a long-range PON system, if the OLT calculates the start time of the quiet window according to the time of sending the response message to the OTL by the ONU 0 km from the OTL, the OLT opens a large quiet window, and the uplink bandwidth is wasted.

In view of this, this embodiment provides the steps described below.

In the process of deploying a fiber distribution network of a PON, an RE is required to be 0 km to 20 km, or 0 km to 40 km from an ONU connected to the RE. The OLT opens the quiet window through the steps described below.

In step 1, after the RE is connected to a PON system, the OLT sends a bandwidth for ONU and RE registration.

In step 2, after receiving the registration bandwidth, the RE sends a response message to the OLT, where the response message contains specific serial number information that is used for identifying the RE.

In step 3, after the OLT receives the response message of the RE, a loop delay between the OLT and the RE is calculated according to the time of sending the registration bandwidth (downlink data) by the OLT in step 1 and the time of receiving the response message of the RE by the OLT.

Through repetition of the preceding steps, the OLT can obtain loop delays between the OLT and two REs. For example, the OLT obtains loop delay T4 between the OLT and a first RE, and loop delay T5 between the OLT and a second RE, where T4 is greater than or equal to T5.

In step 4, the start time used for sending uplink data and allocated by the OLT to the registered ONU is T3, and the OLT prepares to open the quiet window at a time corresponding to T3+T5 and receive a response message of the ONU. The opened quiet window has a size of 250 µs+T4−T5 (corresponding to a PON system with the differential distance of 0 km to 20 km between the RE and the ONU connected to the RE) or 450 µs+T4−T5 (corresponding to a PON system with the differential distance of 0 km to 40 km between the RE and the ONU connected to the RE).

It should be understood by those skilled in the art that the embodiments of the present application may be provided as methods, systems and computer program products. Therefore, the present application can take the form of a hardware embodiment, a software embodiment, or a combination of software and hardware embodiments. Moreover, the present application may take the form of a computer program product implemented on one or more computer-usable storage media (including, but not limited to, a disk memory and an optical memory) that includes computer-usable program codes.

The present application is described with reference to flowcharts and/or block diagrams of methods, devices (systems) and computer program products according to the embodiments of the present application. It should be understood that computer program instructions may implement each flow and/or block in the flowcharts and/or the block diagrams and a combination of flows and/or blocks in the flowcharts and/or the block diagrams. These computer program instructions may be provided for a general-purpose computer, a special-purpose computer, an embedded processor or a processor of another programmable data processing device to produce a machine so that instructions executed by the computer or the processor of another programmable data processing device produce an apparatus for implementing functions designated in one or more flows in the flowcharts and/or one or more blocks in the block diagrams.

These computer program instructions may be stored in a computer-readable memory that can cause the computer or another programmable data processing device to operate in a particular manner so that the instructions stored in the computer-readable memory produce a manufactured product including an instructing apparatus. The instructing apparatus implements the functions designated in the one or more flows in the flowcharts and/or the one or more blocks in the block diagrams.

These computer program instructions may be loaded onto the computer or another programmable data processing device so that a series of operation steps are performed on the computer or another programmable device to produce processing implemented by the computer. Therefore, instructions executed on the computer or another programmable device provide steps for implementing the functions designated in the one or more flows in the flowcharts and/or the one or more blocks in the block diagrams.

The above are only exemplary embodiments of the present application and are not intended to limit the scope of the present application.

What is claimed is:

1. A method for managing an optical network unit (ONU) in a passive optical network, comprising:
   determining a first quiet window and a second quiet window; and
   allocating the first quiet window to an ONU within a first preset distance range and allocating the second quiet window to an ONU within a second preset distance range,
   wherein a distance between an optical line terminal (OLT) and the ONU within the first preset distance range is less than a distance between the OLT and the ONU within the second preset distance range.

2. The method according to claim 1, wherein a start time of the first quiet window is T1+a minimum response time of the ONU within the first preset distance range,
   wherein T1 is a start time of sending uplink data by the ONU within the first preset distance range.

3. The method according to claim 1, wherein a start time of the second quiet window is T2+a minimum response time of the ONU within the second preset distance range+a loop delay between the OLT and a range extender (RE)+an RE response time,
   wherein T2 is a start time of sending uplink data by the ONU within the second preset distance range, the RE is disposed between a first optical splitter and a second optical splitter, the first optical splitter is disposed between the OLT and the ONU within the first preset distance range, and the second optical splitter is disposed between the first optical splitter and the ONU within the second preset distance range.

4. The method according to claim 1, wherein a start time of the second quiet window is T2+a minimum response time of the ONU within the second preset distance range+a minimum loop delay between the OLT and N range extenders (REs)+an RE response time,
   wherein N is an integer greater than or equal to 1, T2 is a start time of sending uplink data by the ONU within the second preset distance range, the N REs are disposed between the OLT and a third optical splitter, and the third optical splitter is disposed between the N REs and the ONU within the second preset distance range.

5. The method according to claim 4, wherein a size of the second quiet window is a maximum loop delay difference between the REs and the ONU+a maximum response time difference of the ONU+a maximum random delay of the ONU+a maximum loop delay difference between the OLT and the REs.

6. The method according to claim 3, wherein before allocating the first quiet window and the second quiet window, the method further comprises:
   receiving a registration response message uploaded by the RE and recording a time of receiving the registration response message; and
   determining the loop delay between the OLT and the RE on a basis of the time of receiving the registration response message and a time of sending a registration bandwidth by the OLT.

7. The method according to claim 4, wherein before allocating the first quiet window and the second quiet window, the method further comprises:
   receiving a registration response message uploaded by the REs and recording a time of receiving the registration response message; and
   determining the loop delay between the OLT and the REs on a basis of the time of receiving the registration response message and a time of sending a registration bandwidth by the OLT.

8. An optical line terminal (OLT), comprising a processor, and a memory configured to store a computer program executable by the processor,
   wherein the processor is configured to perform a method for managing an optical network unit (ONU) when executing the computer program, the processor is configured to:
   determine a first quiet window and a second quiet window; and
   allocate the first quiet window to an ONU within a first preset distance range and allocating the second quiet window to an ONU within a second preset distance range,
   wherein a distance between an optical line terminal (OLT) and the ONU within the first preset distance range is less than a distance between the OLT and the ONU within the second preset distance range.

9. The OLT according to claim 8, wherein a start time of the first quiet window is T1+a minimum response time of the ONU within the first preset distance range,
   wherein T1 is a start time of sending uplink data by the ONU within the first preset distance range.

10. The OLT according to claim 8, wherein a start time of the second quiet window is T2+a minimum response time of the ONU within the second preset distance range+a loop delay between the OLT and a range extender (RE)+an RE response time,
   wherein T2 is a start time of sending uplink data by the ONU within the second preset distance range, the RE is disposed between a first optical splitter and a second optical splitter, the first optical splitter is disposed between the OLT and the ONU within the first preset distance range, and the second optical splitter is disposed between the first optical splitter and the ONU within the second preset distance range.

11. The OLT according to claim 8, wherein a start time of the second quiet window is T2+a minimum response time of the ONU within the second preset distance range+a minimum loop delay between the OLT and N range extenders (REs)+an RE response time,
   wherein N is an integer greater than or equal to 1, T2 is a start time of sending uplink data by the ONU within the second preset distance range, the N REs are disposed between the OLT and a third optical splitter, and the third optical splitter is disposed between the N REs and the ONU within the second preset distance range.

12. The OLT according to claim 11, wherein a size of the second quiet window is a maximum loop delay difference between the REs and the ONU+a maximum response time difference of the ONU+a maximum random delay of the ONU+a maximum loop delay difference between the OLT and the REs.

13. The OLT according to claim 10, wherein the processor is further configured to:
   receive a registration response message uploaded by the RE and record a time of receiving the registration response message; and
   determine the loop delay between the OLT and the RE on a basis of the time of receiving the registration response message and a time of sending a registration bandwidth by the OLT.

14. The OLT according to claim 11, wherein the apparatus further comprises:
   receive a registration response message uploaded by the REs and record a time of receiving the registration response message; and
   determine the loop delay between the OLT and the REs on a basis of the time of receiving the registration response message and a time of sending a registration bandwidth by the OLT.

15. A method for managing an optical network unit (ONU) in a passive optical network, comprising:
   determining a third quiet window and allocating the third quiet window to the ONU,
   wherein a start time of the third quiet window is T3+a minimum response time of the ONU+a minimum loop delay between an optical line terminal (OLT) and N range extenders (REs)+an RE response time; and
   wherein N is an integer greater than or equal to 1, T3 is a start time of sending uplink data by the ONU, the REs are disposed between the OLT and a third optical splitter, and the third optical splitter is disposed between the REs and the ONU.

16. The method according to claim 15, wherein a size of the third quiet window is a maximum loop delay difference between the REs and the ONU+a maximum response time difference of the ONU+a maximum random delay of the ONU+a maximum loop delay difference between the OLT and the REs.

17. The method according to claim 15, wherein before allocating the third quiet window to the ONU, the method further comprises:
   receiving registration response messages uploaded by the REs and recording times of receiving the registration response messages; and
   determining loop delays between the OLT and the REs on a basis of the times of receiving the registration response messages and a time of sending a registration bandwidth by the OLT.

18. An optical line terminal (OLT), comprising a processor and a computer-readable storage medium, wherein the computer-readable storage medium stores instructions executable by the processor, wherein when executing the instructions, the processor is configured to implement the method for managing an optical network unit (ONU) in a passive optical network according to claim 15,
   wherein the method comprises:
   determining a third quiet window and allocating the third quiet window to the ONU;
   wherein a start time of the third quiet window is T3+a minimum response time of the ONU+a minimum loop delay between an optical line terminal (OLT) and N range extenders (REs)+an RE response time; and wherein N is an integer greater than or equal to 1, T3 is a start time of sending uplink data by the ONU, the REs are disposed between the OLT and a third optical splitter, and the third optical splitter is disposed between the N REs and the ONU.

19. The OLT according to claim 18, wherein a size of the third quiet window is a maximum loop delay difference between the REs and the ONU+a maximum response time difference of the ONU+a maximum random delay of the ONU+a maximum loop delay difference between the OLT and the REs.

20. The OLT according to claim 18, wherein before allocating the third quiet window to the ONU, the method further comprises:

receiving registration response messages uploaded by the REs and recording times of receiving the registration response messages; and determining loop delays between the OLT and the REs on a basis of the times of receiving the registration response messages and a time of sending a registration bandwidth by the OLT.

* * * * *